US008318880B2

(12) United States Patent
Fechner et al.

(10) Patent No.: US 8,318,880 B2
(45) Date of Patent: *Nov. 27, 2012

(54) ANIONIC WATER-SOLUBLE ADDITIVES

(75) Inventors: Bjoern Fechner, Eppstein (DE);
Carsten Schaefer, Muehldorf am Inn (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 365 days.

This patent is subject to a terminal disclaimer.

(21) Appl. No.: 12/451,402

(22) PCT Filed: Apr. 29, 2008

(86) PCT No.: PCT/EP2008/003456
§ 371 (c)(1),
(2), (4) Date: Nov. 9, 2009

(87) PCT Pub. No.: WO2008/138486
PCT Pub. Date: Nov. 20, 2008

(65) Prior Publication Data
US 2010/0137536 A1    Jun. 3, 2010

(30) Foreign Application Priority Data

May 10, 2007   (DE) .................. 10 2007 021 869

(51) Int. Cl.
C08F 118/02   (2006.01)
C08F 124/00   (2006.01)
C08F 226/06   (2006.01)

(52) U.S. Cl. ........ 526/319; 526/240; 526/277; 526/287; 526/312; 526/320

(58) Field of Classification Search .................. 526/319, 526/240, 277, 287, 312, 320
See application file for complete search history.

(56) References Cited

U.S. PATENT DOCUMENTS

| 4,156,616 | A | 5/1979 | Dietz et al. | |
| 5,484,851 | A | 1/1996 | Fock | |
| 5,798,425 | A * | 8/1998 | Albrecht et al. | 526/271 |
| 6,211,317 | B1 * | 4/2001 | Albrecht et al. | 526/271 |
| 6,511,952 | B1 | 1/2003 | Schwartz | |
| 6,582,510 | B1 | 6/2003 | Schwartz | |
| 7,629,411 | B2 | 12/2009 | Becker et al. | |
| 7,938,900 | B2 | 5/2011 | Fechner et al. | |
| 8,202,361 | B2 | 6/2012 | Fechner et al. | |
| 2002/0019459 | A1 * | 2/2002 | Albrecht et al. | 523/161 |
| 2002/0132890 | A1 | 9/2002 | Ramesh et al. | |
| 2002/0137865 | A1 | 9/2002 | Hambennestel | |
| 2003/0209695 | A1 * | 11/2003 | Tsuzuki et al. | 252/363.5 |
| 2008/0275166 | A1 | 11/2008 | Becker et al. | |
| 2008/0293874 | A1 | 11/2008 | Schrod et al. | |
| 2010/0137537 | A1 | 6/2010 | Fechner et al. | |
| 2011/0065879 | A1 | 3/2011 | Fechner et al. | |
| 2011/0185781 | A1 | 8/2011 | Fechner et al. | |
| 2011/0213094 | A1 | 9/2011 | Fechner et al. | |
| 2011/0244385 | A1 | 10/2011 | Fechner et al. | |

FOREIGN PATENT DOCUMENTS

| DE | 2638946 | 3/1978 |
| DE | 102004042799 | 3/2006 |
| EP | 1081169 | 3/2001 |
| EP | 1562696 | 6/2004 |
| JP | 2007070567 | 3/2007 |
| WO | WO 2006114303 | 11/2006 |

OTHER PUBLICATIONS

PCT International Search Report for PCT/EP2008/003456, Sep. 23, 2008.
English Translation of the International Preliminary Report on Patentability for PCT/EP2008/003456, Dec. 17, 2009.
English Abstract for JP 2007070567, Mar. 22, 2007.

* cited by examiner

*Primary Examiner* — Michael M Bernshteyn
(74) *Attorney, Agent, or Firm* — Anthony A. Bisulca

(57) ABSTRACT

The invention relates to anionically modified copolymers that can be produced by the polymerization of monomers (A), (B) and (C) to obtain non-ionic polymers with reactive terminal OH groups and by the subsequent reaction of the terminal OH groups to form anionic end groups. According to the invention, (A) is a monomer of formula (I), in which A represents $C_2$-$C_4$ alkene and B represents a $C_2$-$C_4$ alkene that is different from A, R represents hydrogen or methyl, m is a number between 1 and 500, n is a number between 1 and 500, (B) is an ethylenically unsaturated monomer containing an aromatic group and (C) is a ethylenically unsaturated monomer.

12 Claims, No Drawings

ANIONIC WATER-SOLUBLE ADDITIVES

The present invention relates to novel anionic copolymers, which are used as dispersants for waterborne pigment formulations, and to a process for producing these copolymers.

Dispersing pigments in liquid media typically requires dispersants. Dispersants, augmented by suitable welters, act as surface-active agents in promoting the wetting of the pigments to be dispersed, and facilitate the deconstruction of agglomerates and aggregates when producing pigment dispersions, which is generally accomplished with the aid of a grinding operation in order that high mechanical forces may be introduced into the system. Dispersants can be of anionic, cationic, amphoteric or neutral structure. They can be of low molecular weight, or represent high molecular weight polymers which constitute a random, alternating, blocklike, comblike or star-shaped architecture of the polymerized monomers.

Examples of where dispersants are of particular commercial importance are the dispersing of pigments in the manufacture of pigment concentrates (used for coloration of emulsion and varnish colors, paints, coatings and printing inks) and also the coloration of paper, cardboard and textiles.

Comb copolymers are usually prepared using macromonomers based on mono(meth)acrylic esters as comonomers, and they differ from other polymeric dispersants in that they have a clearly ordered structure wherein hydrophobicity and hydrophilicity, or polarity, can be apportioned between the main chain and the side chains.

EP 1 293 523 describes a dispersant which is a polymer which has a weight average molecular weight of about 5000 to 100 000 and comprises 20% to 80% by weight of a hydrophilic backbone and 80% to 20% by weight of macromonomeric side chains. The backbone consists of 70% to 98% by weight, based on the weight of the backbone, of polymerized ethylenically unsaturated monomers free of any carboxyl groups, and also 2% to 30% by weight of polymerized ethylenically unsaturated monomers bearing a carboxyl group, wherein at least 10% of the carboxyl groups are neutralized with an amine or an inorganic base. The backbone is hydrophilic in comparison to the side chains. The side chains consist of macromonomers of polymerized ethylenically unsaturated monomers.

EP 1 081 169 describes branched polymers derived from the following mixture of monomers:
(A) 50% to 93% by weight of at least one ethylenically unsaturated monomer,
(B) 2% to 25% by weight of at least one ethylenically unsaturated macromonomer having a molecular weight of 1000 to 20 000, and
(C) 5% to 25% by weight of at least one polymerizable imidazole derivative.

EP 1 562 696 describes polymeric dispersants synthesized, in aqueous emulsion polymerization, using macromonomers consisting of polyalkylene glycol mono(meth)acrylates. The main chain of the polymer must contain ethylenically unsaturated monomers having at least one amino group.

DE 10 2005 019 384 (WO 2006 114 303 A1) describes comb polymers which are synthesized from ethylenically unsaturated monomers such as alkyl (meth)acrylates and aryl (meth)acrylates in combination with a pure polyethylene glycol mono(meth)acrylate, and are used as dispersants.

However, none of the polymeric dispersants presented in the references cited above is able to meet all the requirements demanded of anionic novolak dispersants:
(i) dispersing organic pigments in high concentration above 40% to low-viscosity dispersions;
(ii) forming dispersions of high and reproducible color strength which are capable of coloring particularly white dispersions and pulp suspensions to highly compatible effect;
(iii) preventing reagglomeration of the pigment particles; and
(iv) foam completely absent from the dispersions.

The hitherto customary novolak dispersants contain, as a consequence of their process of production, residues of alkylphenols, frequently nonylphenol, and ethoxylates thereof. Since alkylphenol ethoxylates, or their degradation products, scarcely undergo any degradation in the environment, they build up. This is problematic in that they have a hormonal effect on aquatic organisms. Therefore, many countries have adopted legislation (2003/53/EC for example) which limits or bans the use of materials containing alkylphenols or their ethoxylates in open-loop systems.

Studies to date have shown that it is still extremely difficult to synthesize dispersants that are equivalent to anionic novolak systems. There is accordingly a need for novel dispersants that are capable of dispersing organic pigments in high concentration above 40% to low-viscosity dispersions. These dispersions shall be straightforward to produce; i.e., the pigments shall be readily wetted and be readily incorporated into the aqueous medium. The dispersion shall have a high and reproducible color strength that remains stable for a period of several years. Similarly, all further coloristic parameters such as, for example, hue angle and chroma shall be reproducible and stable. Furthermore, the dispersion shall have a low viscosity; the pigments must neither agglomerate nor flocculate nor cream up or form a sediment. The dispersion should not foam or cause or speed foaming in the application medium. Moreover, the dispersions should contribute to broad compatibility of the dispersions in various application media. Also, the dispersion shall be shear stable; i.e., its color strength or coloristics must not change under shearing, and the dispersion shall remain resistant to flocculation under these conditions.

It has now been found that, surprisingly, specific anionic comb copolymers, prepared by means of macromonomers composed of polyethylene/polypropylene glycol mono (meth)acrylic esters, achieve this object.

The present invention accordingly provides anionically modified copolymers obtainable by polymerization of monomers (A), (B) and (C) to obtain nonionic copolymers which have reactive terminal OH groups, and subsequent conversion of the terminal OH groups to anionic end groups, for example to sulfuric monoesters, where
(A) is a monomer of formula (I)

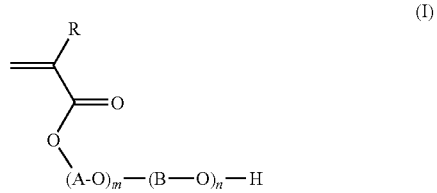

where
A represents $C_2$-$C_4$-alkylene,
B represents a $C_2$-$C_4$-alkylene other than A,
R represents hydrogen or methyl,
m is from 1 to 500, preferably 1 to 50;
n is from 1 to 500, preferably 1 to 50,
and the sum total of m+n is from 2 to 1000;

(B) is an ethylenically unsaturated monomer which contains an aromatic group; and (C) is an ethylenically unsaturated monomer which contains an alkyl radical.

The copolymer of the present invention has customary terminal groups which are formed by the initiation of the free-radical polymerization or by chain transfer reactions or by chain termination reactions, for example a proton, a group derived from a free-radical initiator or a sulfur-containing group derived from a chain transfer reagent.

The anionic end groups can be sulfates, carboxylates or phosphates.

The molar fraction of the monomers is preferably 1 to 80% for monomer (A), 0.1 to 80% for monomer (B) and 0.1 to 80% for monomer (C).

It is particularly preferable for the molar fraction of the monomers to be 10 to 70% for monomer (A), 10 to 60% for monomer (B) and 10 to 60% for monomer (C).

The alkylene oxide units $(A-O)_m$ and $(B-O)_n$ can be present either in a random arrangement or, as in the case of a preferred embodiment, in a blocklike arrangement.

In one preferred embodiment, $(A-O)_m$ represents propylene oxide units and $(B-O)_n$ represents ethylene oxide units, or $(A-O)_m$ represents ethylene oxide units and $(B-O)_n$ represents propylene oxide units, and the molar fraction of ethylene oxide units is preferably 50 to 98%, more preferably 60 to 95% and even more preferably 70 to 95%, based on the sum total (100%) of ethylene oxide and propylene oxide units.

The sum total of the alkylene oxide units can in principle be n+m=2 to 1000, although 2 to 500 is preferred, 2 to 100 is particularly preferred and 5 to 100 is even more particularly preferred.

Preferred monomers (B) can be described by the formula (IIa) or (IIb):

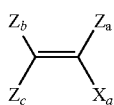

(IIa)

where
$X_a$ represents an aromatic or araliphatic radical having 3 to 30 carbon atoms which optionally contains one or more of the hetero atoms N, O and S,
$Z_a$ represents H or $(C_1-C_4)$-alkyl,
$Z_b$ represents H or $(C_1-C_4)$-alkyl,
$Z_c$ represents H or $(C_1-C_4)$-alkyl;

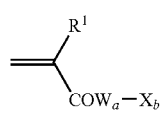

(IIb)

where
$R^1$ represents hydrogen or methyl,
$X_b$ represents an aromatic or araliphatic radical having 3 to 30 carbon atoms which optionally contains one or more of the hetero atoms N, O and S,
$W_a$ represents oxygen or an NH group.

Useful monomers (B) include for example the following esters and amides of acrylic acid and methacrylic acid: phenyl, benzyl, tolyl, 2-phenoxyethyl, phenethyl. Further monomers (B) are vinylaromatic monomers such as styrene and its derivatives, such as vinyltoluene and alpha-methylstyrene for example. The aromatic unit may also comprise heteroaromatics, as in 1-vinylimidazole for example.

Particularly preferred monomers (B) can be: styrene, 1-vinylimidazole, benzyl methacrylate, 2-phenoxyethyl methacrylate and phenethyl methacrylate.

Preferred monomers (C) can be described by formula (III):

(III)

where
$R^2$ represents hydrogen or methyl,
Y represents an aliphatic hydrocarbyl radical having 1 to 30 carbon atoms, preferably 6 to 30, particularly 9 to 20 carbon atoms, which may be linear or branched or else cyclic, and which may contain hetero atoms O, N and/or S and may also be unsaturated,
$W_b$ represents oxygen or an NH group.

Monomers (C) include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethylcyclohexyl, 2-ethoxyethyl, tetrahydrofurfuryl and tetrahydropyranyl.

Preferred monomers (C) are the following alkyl esters and alkylamides of acrylic acid and methacrylic acid: methyl, ethyl, propyl, butyl, isobutyl, 2-ethoxyethyl, myristyl, octadecyl, more preferably 2-ethylhexyl and lauryl.

The copolymers of the present invention have a molecular weight of $10^3$ g/mol to $10^9$ g/mol, more preferably of $10^3$ to $10^7$ g/mol and even more preferably of $10^3$ to $10^5$ g/mol.

It is an essential property of the polymers according to the present invention that their polyalkylene glycol side chains are not purely polyethylene glycols or polypropylene glycols. Rather, the polyalkylene glycols are either random or preferably blocklike polyalkylene glycols composed of propylene oxide and ethylene oxide units. It is only the fine-tuning of this EO/PO ratio that provides polymeric dispersants useful for preparing highly concentrated pigment dispersions of low viscosity. The optimized ratios for the EO/PO fraction in the monomer (A) in combination with the aromatic and aliphatic monomers (B) and (C) makes it possible to emulate the properties of novolak-type dispersants such that a very similar performance profile is obtained.

In contrast to the polymers of the present invention, polymers which have carboxylate groups on the polymer backbone are not suitable for producing pigment dispersions having high concentrations of organic pigments of above 40%, since they lead to excessively high viscosities.

The copolymers of the present invention can be produced by means of free-radical polymerization. The polymerization reaction can be carried out as a continuous operation, as a batch operation or as a semi-continuous operation.

The polymerization reaction is advantageously conducted as a precipitation polymerization, an emulsion polymerization, a solution polymerization, a bulk polymerization or a gel polymerization. A solution polymerization is particularly advantageous for the performance profile of the copolymers of the present invention.

Useful solvents for the polymerization reaction include all organic or inorganic solvents which are very substantially inert with regard to free-radical polymerization reactions, examples being ethyl acetate, n-butyl acetate or 1-methoxy-2-propyl acetate, and also alcohols such as, for example, ethanol, i-propanol, n-butanol, 2-ethylhexanol or 1-methoxy-2-propanol, and also diols such as ethylene glycol and propylene glycol. It is similarly possible to use ketones such as acetone, butanone, pentanone, hexanone and methyl ethyl ketone, alkyl esters of acetic, propionic and butyric acids such as for example ethyl acetate, butyl acetate and amyl acetate, ethers such as tetrahydrofuran, diethyl ethers, and monoalkyl and dialkyl ethers of ethylene glycol and of polyethylene glycol. It is similarly possible to use aromatic solvents such as, for example, toluene, xylene or higher-boiling alkylbenzenes. The use of solvent mixtures is likewise conceivable, in which case the choice of solvent or solvents depends on the planned use of the copolymer of the present invention. Preference is given to using water; lower alcohols; preferably methanol, ethanol, propanols, iso-, sec- and t-butanols, 2-ethylhexanol, butyl glycol and butyl diglycol, more preferably isopropanol, t-butanol, 2-ethylhexanol, butyl glycol and butyl diglycol; hydrocarbons having 5 to 30 carbon atoms and mixtures and emulsions thereof.

The polymerization reaction is preferably carried out in the temperature range between 0 and 180° C., more preferably between 10 and 100° C., not only at atmospheric pressure but also under elevated or reduced pressure. If appropriate, the polymerization can also be carried out under a protective gas atmosphere, preferably under nitrogen.

The polymerization can be induced using high-energy, electromagnetic rays, mechanical energy or the customary, chemical polymerization initiators such as organic peroxides, for example benzoyl peroxide, tert-butyl hydroperoxide, methyl ethyl ketone peroxide, cumoyl peroxide, dilauroyl peroxide (DLP) or azo initiators, for example azoisobutyronitrile (AIBN), azobisamidopropyl hydrochloride (ABAH) and 2,2'-azobis(2-methylbutyronitrile) (AMBN). Similarly useful are inorganic peroxy compounds, for example $(NH_4)_2S_2O_8$, $K_2S_2O_8$ or $H_2O_2$, if appropriate in combination with reducing agents (for example sodium hydrogensulfite, ascorbic acid, iron(II) sulfate) or redox systems which contain an aliphatic or aromatic sulfonic acid (for example benzenesulfonic acid, toluenesulfonic acid) as reducing component.

The customary molecular weight regulators are used. Suitable known regulators include for example alcohols, such as methanol, ethanol, propanol, isopropanol, n-butanol, sec-butanol and amyl alcohols, aldehydes, ketones, alkylthiols, for example dodecylthiol and tert-dodecylthiol, thioglycolic acid, isooctyl thioglycolate and some halogen compounds, for example carbon tetrachloride, chloroform and methylene chloride.

Following the polymerization, the solvent is removed.

The nonionic polymer thus obtained now possesses, on the polyoxyalkylene side chains, reactive hydroxyl functions which are next converted to anionic functionalities. Examples of anionic functionalites are $SO_3M$, $CH_2COOM$, $PO_3M_2$ or sulfosuccinate. M therein has the hereinbelow defined meaning.

The anionic copolymers of the present invention can be described for example by the formulae (IV) or (V).

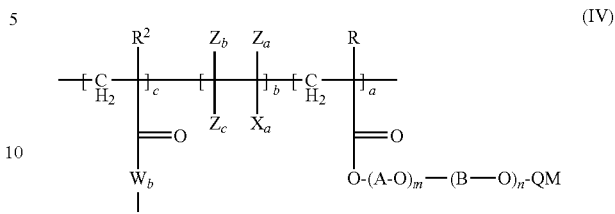

(IV)

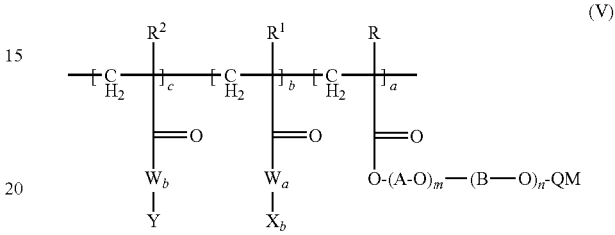

(V)

The indices a, b and c indicate the molar fraction of the respective monomer (A), (B) and (C), viz.:
a=0.01-0.8
b=0.001-0.8
c=0.001-0.8
subject to the proviso that the sum of a+b+c is equal to 1, and more preferably
a=0.1-0.7
b=0.1-0.6
c=0.1-0.6
subject to the proviso that the sum total of a+b+c is equal to 1.

In formulae (IV) and (V), Q represents $SO_3$, $CH_2COO$, $PO_3M$,
or QM

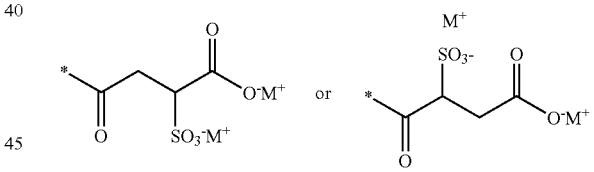

and M represents H, a monovalent metal cation, a divalent metal cation, $NH_4^+$, a secondary, tertiary or quaternary ammonium ion, or a combination thereof, or represents equivalents of di-, tri- or polyvalent metal ions such as for example $Ca^{2+}$ or $Al^{3+}$ (the asterisk * in the Markush formula indicates that there is a link to the polymer at this site).

In the case of the sulfosuccinates, the nonionic copolymers are for example initially esterified with maleic anhydride. Here the esterification can be carried out without solvent in that the reaction can be carried out in the polymer melt under elevated temperature. Subsequently, the maleic monoester obtained is sulfonated. To this end, it is reacted for example with sodium sulfite or sodium pyrosulfite in an aqueous solution. The product obtained is the aqueous solution of the sulfosuccinate sodium salt.

The sulfate esters are prepared for example by reacting the nonionic copolymers with sulfamic acid. This reaction takes place in a melt of the nonionic copolymer in the presence of sulfamic acid. The OH groups of the copolymer are converted into sulfate esters, which are then present as ammonium salt.

The terminal hydroxyl functions can be converted into the corresponding polyether carboxylates by carboxymethylation, for example with sodium chloroacetate.

The phosphoric esters are obtainable for example by reacting a melt of the nonionic copolymer with polyphosphoric acid or phosphorus pentoxide. This reaction may yield not only phosphoric monoesters but also phosphoric diesters and triesters.

The present invention further provides for the use of the anionic copolymer of the present invention as a dispersant particularly for pigments and fillers, for example for waterborne pigment concentrates which are used for coloration of dispersion and varnish colors, paints, coatings and printing inks, and also for coloration of paper, cardboard and textiles.

Synthesis examples of anionic copolymers having ether sulfate groups on the side chains:

SYNTHESIS EXAMPLE 1

A flask equipped with stirrer, reflux condenser, internal thermometer and nitrogen inlet was initially charged with 258 g of polyalkylene glycol monomethacrylate (molar mass 750, molar EO/PO ratio 6.3), 136.4 g of 2-ethylhexyl methacrylate, 71.6 g of styrene and 16.5 g of 1-dodecanethiol in 660 ml of tertiary butanol under nitrogen. Then, the initial charge was heated to 80° C. with stirring. On attainment of the reaction temperature 16.5 g of AMBN initiator, dissolved in 130 ml isobutanol, were added during 1 hour. This was followed by a further 5 hours of stirring at that temperature. After cooling to room temperature, the solvent was removed in vacuo.

Molar mass of polymer obtained: $M_w$=15 100 g/mol (by GPC, reference: polyethylene glycol).

The polymer thus obtained was initially charged to a flask under nitrogen together with 32.7 g of sulfamic acid and 1.0 g of urea. The initial charge was then heated to 100° C. for 4 hours with stirring. Then the pH was adjusted to 6.5-7.5 with 50% aqueous sodium hydroxide solution. NMR spectroscopy verified a degree of conversion of >95% to the corresponding sulfuric ester ammonium salt.

SYNTHESIS EXAMPLE 2

A flask equipped with stirrer, reflux condenser, internal thermometer and nitrogen inlet was initially charged with 210 g of polyalkylene glycol monomethacrylate (molar mass 350, molar EO/PO ratio 1.7), 79.2 g of 2-ethylhexyl methacrylate, 41.6 g of styrene and 13.4 g of 1-dodecanethiol in 470 ml of tertiary butanol under nitrogen. Then, the initial charge was heated to 80° C. with stirring. On attainment of the reaction temperature 13.4 g of AMBN initiator, dissolved in 95 ml isobutanol, were added during 1 hour. This was followed by a further 5 hours of stirring at that temperature. After cooling to room temperature, the solvent was removed in vacuo.

Molar mass of polymer obtained: $M_w$=6900 g/mol (by GPC, reference: polyethylene glycol).

The polymer thus obtained was initially charged to a flask under nitrogen together with 57.1 g of sulfamic acid and 1.8 g of urea. The initial charge was then heated to 100° C. for 4 hours with stirring. Then the pH was adjusted to 6.5-7.5 with 50% aqueous sodium hydroxide solution. NMR spectroscopy verified a degree of conversion of >95% to the corresponding sulfuric ester ammonium salt.

SYNTHESIS EXAMPLE 3

A flask equipped with stirrer, reflux condenser, internal thermometer and nitrogen inlet was initially charged with 258 g of polyalkylene glycol monomethacrylate (molar mass 750, molar EO/PO ratio 6.3), 87.5 g of lauryl methacrylate, 35.8 g of styrene and 9.9 g of 1-dodecanethiol in 530 ml of tertiary butanol under nitrogen. Then, the initial charge was heated to 80° C. with stirring. On attainment of the reaction temperature 9.9 g of AMBN initiator, dissolved in 110 ml isobutanol, were added during 1 hour. This was followed by a further 5 hours of stirring at that temperature. After cooling to room temperature, the solvent was removed in vacuo.

Molar mass of polymer obtained: $M_w$=14 000 g/mol (by GPC, reference: polyethylene glycol).

The polymer thus obtained was initially charged to a flask under nitrogen together with 32.7 g of sulfamic acid and 1.0 g of urea. The initial charge was then heated to 100° C. for 4 hours with stirring. Then the pH was adjusted to 6.5-7.5 with 50% aqueous sodium hydroxide solution. NMR spectroscopy verified a degree of conversion of >95% to the corresponding sulfuric ester ammonium salt.

SYNTHESIS EXAMPLE 4

A flask equipped with stirrer, reflux condenser, internal thermometer and nitrogen inlet was initially charged with 210 g of polyalkylene glycol monomethacrylate (molar mass 350, molar EO/PO ratio 1.7), 101.6 g of lauryl methacrylate, 41.6 g of styrene and 13.4 g of 1-dodecanethiol in 500 ml of tertiary butanol under nitrogen. Then, the initial charge was heated to 80° C. with stirring. On attainment of the reaction temperature 13.4 g of AMBN initiator, dissolved in 100 ml isobutanol, were added during 1 hour. This was followed by a further 5 hours of stirring at that temperature. After cooling to room temperature, the solvent was removed in vacuo.

Molar mass of polymer obtained: $M_w$=7700 g/mol (by GPC, reference: polyethylene glycol).

The polymer thus obtained was initially charged to a flask under nitrogen together 57.1 g of sulfamic acid and 1.0 g of urea. The initial charge was then heated to 100° C. for 4 hours with stirring. Then the pH was adjusted to 6.5-7.5 with 50% aqueous sodium hydroxide solution. NMR spectroscopy verified a degree of conversion of >95% to the corresponding sulfuric ester ammonium salt.

Synthesis examples of anionic copolymers having sulfosuccinate groups on the side chains:

SYNTHESIS EXAMPLE 5

A flask equipped with stirrer, reflux condenser, internal thermometer and nitrogen inlet was initially charged with 363 g of polyalkylene glycol monomethacrylate (molar mass 1100, molar EO/PO ratio 10.2, 70% in t-butanol), 117.3 g of lauryl methacrylate, 48.0 g of styrene and 11.1 g of 1-dodecanethiol in 730 ml of tertiary butanol under nitrogen. Then, the initial charge was heated to 80° C. with stirring. On attainment of the reaction temperature 11.1 g of AMBN initiator, dissolved in 150 ml of isobutanol, were added during 1 hour. This was followed by a further 5 hours of stirring at that temperature. After cooling to room temperature, the solvent was removed in vacuo. Molar mass of polymer obtained $M_w$=22 000 g/mol (by GPC, reference: polyethylene glycol).

The copolymer thus obtained was initially charged to a flask under nitrogen.

Then 22.7 g of maleic anhydride and 0.7 g of sodium hydroxide were added followed by heating to a temperature of 75 to 85° C. with stirring. Stirring was continued at that temperature for three hours and then 292 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 6

A flask equipped with stirrer, reflux condenser, internal thermometer and nitrogen inlet was initially charged with 452 g of polyalkylene glycol monomethacrylate (molar mass 2000, molar EO/PO ratio 20.5, 70% in t-butanol), 80.4 g of lauryl methacrylate, 32.9 g of styrene and 7.6 g of 1-dodecanethiol in 780 ml of tertiary butanol under nitrogen. Then, the initial charge was heated to 80° C. with stirring.

On attainment of the reaction temperature 7.6 g of AMBN initiator, dissolved in 160 ml of isobutanol, were added during 1 hour. This was followed by a further 5 hours of stirring at that temperature. After cooling to room temperature, the solvent was removed in vacuo. Molar mass of polymer obtained $M_w$=30 500 g/mol (by GPC, reference: polyethylene glycol).

The copolymer thus obtained was initially charged to a flask under nitrogen.

Then 15.5 g of maleic anhydride and 0.5 g of sodium hydroxide were added followed by heating to a temperature of 75 to 85° C. with stirring. Stirring was continued at that temperature for three hours and then 199 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 7

A flask equipped with stirrer, reflux condenser, internal thermometer and nitrogen inlet was initially charged with 210 g of polyalkylene glycol monomethacrylate (molar mass 350, molar EO/PO ratio 1.7), 202.8 g of stearyl methacrylate, 62.4 g of styrene and 11.5 g of 1-dodecanethiol in 660 ml of tertiary butanol under nitrogen. Then, the initial charge was heated to 80° C. with stirring. On attainment of the reaction temperature 11.5 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=8100 g/mol (by GPC, reference: polyethylene glycol).

The copolymer thus obtained was initially charged to a flask under nitrogen.

Then 58.8 g of maleic anhydride and 1.9 g of sodium hydroxide were added followed by heating to a temperature of 75 to 85° C. with stirring. Stirring was continued at that temperature for three hours and then 756 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 8

A flask equipped with stirrer, reflux condenser, internal thermometer and nitrogen inlet was initially charged with 258 g of polyalkylene glycol monomethacrylate (molar mass 750, molar EO/PO ratio 6.3), 38.2 g of isobornyl methacrylate, 30.3 g of benzyl methacrylate and 13.2 g of 1-dodecanethiol in 470 ml of tertiary butanol under nitrogen. Then, the initial charge was heated to 80° C. with stirring. On attainment of the reaction temperature 13.2 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=15 000 g/mol (by GPC, reference: polyethylene glycol).

The copolymer thus obtained was initially charged to a flask under nitrogen.

Then 33.7 g of maleic anhydride and 1.1 g of sodium hydroxide were added followed by heating to a temperature of 75 to 85° C. with stirring. Stirring was continued at that temperature for three hours and then 433 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 9

A flask equipped with stirrer, reflux condenser, internal thermometer and nitrogen inlet was initially charged with 363 g of polyalkylene glycol monomethacrylate (molar mass 1100, molar EO/PO ratio 10.2, 70% in t-butanol), 39.3 g of tetrahydrofurfuryl methacrylate, 87.8 g of phenethyl methacrylate and 8.9 g of 1-dodecanethiol in 670 ml of tertiary butanol under nitrogen. Then, the initial charge was heated to 80° C. with stirring. On attainment of the reaction temperature 8.9 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=25 800 g/mol (by GPC, reference: polyethylene glycol).

The copolymer thus obtained was initially charged to a flask under nitrogen.

Then 22.7 g of maleic anhydride and 0.7 g of sodium hydroxide were added followed by heating to a temperature of 75 to 85° C. with stirring. Stirring was continued at that temperature for three hours and then 292 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 10

A flask equipped with stirrer, reflux condenser, internal thermometer and nitrogen inlet was initially charged with 452 g of polyalkylene glycol monomethacrylate (molar mass 2000, molar EO/PO ratio 20.5, 70% in t-butanol), 25.0 g of 2-ethoxyethyl methacrylate, 29.7 g of 1-vinylimidazole and 6.1 g of 1-dodecanethiol in 700 ml of tertiary butanol under nitrogen. Then, the initial charge was heated to 80° C. with stirring. On attainment of the reaction temperature 6.1 g of AMBN initiator, dissolved in 140 ml of isobutanol, were added during 1 hour. This was followed by a further 5 hours of stirring at that temperature. After cooling to room temperature, the solvent was removed in vacuo. Molar mass of polymer obtained $M_w$=26 000 g/mol (by GPC, reference: polyethylene glycol).

The copolymer thus obtained was initially charged to a flask under nitrogen.

Then 15.5 g of maleic anhydride and 0.5 g of sodium hydroxide were added followed by heating to a temperature of 75 to 85° C. with stirring. Stirring was continued at that temperature for three hours and then 199 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 11

A flask equipped with stirrer, reflux condenser, internal thermometer and nitrogen inlet was initially charged with 210 g of polyalkylene glycol monomethacrylate (molar mass 350, molar EO/PO ratio 1.7), 69.0 g of lauryl acrylate, 52.8 g of benzyl methacrylate and 15.3 g of 1-dodecanethiol in 480 ml of tertiary butanol under nitrogen. Then, the initial charge was heated to 80° C. with stirring. On attainment of the reaction temperature 15.3 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=7700 g/mol (by GPC, reference: polyethylene glycol).

The copolymer thus obtained was initially charged to a flask under nitrogen.

Then 58.8 g of maleic anhydride and 1.9 g of sodium hydroxide were added followed by heating to a temperature of 75 to 85° C. with stirring. Stirring was continued at that temperature for three hours and then 755 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 12

A flask equipped with stirrer, reflux condenser, internal thermometer and nitrogen inlet was initially charged with 258 g of polyalkylene glycol monomethacrylate (molar mass 750, molar EO/PO ratio 6.3), 38.2 g of 1-vinyl-2-pyrrolidone, 107.3 g of styrene and 16.5 g of 1-dodecanethiol in 580 ml of tertiary butanol under nitrogen. Then, the initial charge was heated to 80° C. with stirring. On attainment of the reaction temperature 16.5 g of AMBN initiator, dissolved in 120 ml of isobutanol, were added during 1 hour. This was followed by a further 5 hours of stirring at that temperature. After cooling to room temperature, the solvent was removed in vacuo. Molar mass of polymer obtained $M_w$=12 100 g/mol (by GPC, reference: polyethylene glycol).

The copolymer thus obtained was initially charged to a flask under nitrogen.

Then 33.7 g of maleic anhydride and 1.1 g of sodium hydroxide were added followed by heating to a temperature of 75 to 85° C. with stirring. Stirring was continued at that temperature for three hours and then 433 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 13

A flask equipped with stirrer, reflux condenser, internal thermometer and nitrogen inlet was initially charged with 452 g of polyalkylene glycol monomethacrylate (molar mass 2000, molar EO/PO ratio 20.5, 70% in t-butanol), 31.3 g of 2-ethylhexyl methacrylate, 27.8 g of benzyl methacrylate and 4.6 g of 1-dodecanethiol in 700 ml of tertiary butanol under nitrogen. Then, the initial charge was heated to 80° C. with stirring. On attainment of the reaction temperature 4.6 g of AMBN initiator, dissolved in 140 ml of isobutanol, were added during 1 hour. This was followed by a further 5 hours of stirring at that temperature. After cooling to room temperature, the solvent was removed in vacuo. Molar mass of polymer obtained $M_w$=27 000 g/mol (by GPC, reference: polyethylene glycol). The copolymer thus obtained was initially charged to a flask under nitrogen. Then 1.5.5 g of maleic anhydride and 0.5 g of sodium hydroxide were added followed by heating to a temperature of 75 to 85° C. with stirring. Stirring was continued at that temperature for three hours and then 199 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 14

A flask equipped with stirrer, reflux condenser, internal thermometer and nitrogen inlet was initially charged with 363 g of polyalkylene glycol monomethacrylate (molar mass 1100, molar EO/PO ratio 10.2, 70% in t-butanol), 58.7 g of lauryl methacrylate, 43.9 g of phenethyl methacrylate and 6.7 g of 1-dodecanethiol in 630 ml of tertiary butanol under nitrogen. Then, the initial charge was heated to 80° C. with stirring. On attainment of the reaction temperature 6.7 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=23 000 g/mol (by GPC, reference: polyethylene glycol).

The copolymer thus obtained was initially charged to a flask under nitrogen.

Then 22.7 g of maleic anhydride and 0.7 g of sodium hydroxide were added followed by heating to a temperature of 75 to 85° C. with stirring. Stirring was continued at that temperature for three hours and then 292 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 15

A flask equipped with stirrer, reflux condenser, internal thermometer and nitrogen inlet was initially charged with 258 g of polyalkylene glycol monomethacrylate (molar mass 750, molar EO/PO ratio 6.3), 116.3 g of stearyl methacrylate, 70.9 g of 2-phenoxyethyl methacrylate and 9.9 g of 1-dodecanethiol in 620 ml of tertiary butanol under nitrogen. Then, the initial charge was heated to 80° C. with stirring. On attainment of the reaction temperature 9.9 g of AMBN initiator, dissolved in 120 ml of isobutanol, were added during 1 hour. This was followed by a further 5 hours of stirring at that temperature. After cooling to room temperature, the solvent was removed in vacuo. Molar mass of polymer obtained $M_w$=11 200 g/mol (by GPC, reference: polyethylene glycol).

The copolymer thus obtained was initially charged to a flask under nitrogen.

Then 33.7 g of maleic anhydride and 1.1 g of sodium hydroxide were added followed by heating to a temperature of 75 to 85° C. with stirring. Stirring was continued at that temperature for three hours and then 433 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 16

A flask equipped with stirrer, reflux condenser, internal thermometer and nitrogen inlet was initially charged with 210 g of polyalkylene glycol monomethacrylate (molar mass 350, molar EO/PO ratio 0.43), 72.0 g of lauryl acrylate, 52.8 g of benzyl methacrylate and 11.1 g of 1-dodecanethiol in 480 ml of tertiary butanol under nitrogen. Then, the initial charge was heated to 80° C. with stirring. On attainment of the reaction temperature 11.1 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=8400 g/mol (by GPC, reference: polyethylene glycol).

The copolymer thus obtained was initially charged to a flask under nitrogen.

Then 58.8 g of maleic anhydride and 1.9 g of sodium hydroxide were added followed by heating to a temperature of 75 to 85° C. with stirring. Stirring was continued at that temperature for three hours and then 755 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 17

A flask equipped with stirrer, reflux condenser, internal thermometer and nitrogen inlet was initially charged with 258 g of polyalkylene glycol monomethacrylate (molar mass 750, molar EO/PO ratio 0.22), 87.5 g of lauryl methacrylate, 35.8 g of styrene and 9.9 g of 1-dodecanethiol in 530 ml of tertiary butanol under nitrogen. Then, the initial charge was heated to 80° C. with stirring. On attainment of the reaction temperature 9.9 g of AMBN initiator, dissolved in 110 ml of isobutanol, were added during 1 hour. This was followed by a further 5 hours of stirring at that temperature. After cooling to room temperature, the solvent was removed in vacuo. Molar mass of polymer obtained $M_w$=10 700 g/mol (by GPC, reference: polyethylene glycol).

The copolymer thus obtained was initially charged to a flask under nitrogen.

Then 33.7 g of maleic anhydride and 1.1 g of sodium hydroxide were added followed by heating to a temperature of 75 to 85° C. with stirring. Stirring was continued at that temperature for three hours and then 433 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 18

A flask equipped with stirrer, reflux condenser, internal thermometer and nitrogen inlet was initially charged with 363 g of polyalkylene glycol monomethacrylate (molar mass 1100, molar EO/PO ratio 0.30, 70% in t-butanol), 58.7 g of lauryl methacrylate, 43.9 g of phenethyl methacrylate and 6.7 g of 1-dodecanethiol in 630 ml of tertiary butanol under nitrogen. Then, the initial charge was heated to 80° C. with stirring. On attainment of the reaction temperature 6.7 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=24 000 g/mol (by GPC, reference: polyethylene glycol).

The copolymer thus obtained was initially charged to a flask under nitrogen.

Then 22.7 g of maleic anhydride and 0.7 g of sodium hydroxide were added followed by heating to a temperature of 75 to 85° C. with stirring. Stirring was continued at that temperature for three hours and then 292 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 19

A flask equipped with stirrer, reflux condenser, internal thermometer and nitrogen inlet was initially charged with 388 g of polyalkylene glycol monomethacrylate (molar mass 750, molar EO/PO ratio 6.3), 68.2 g of 2-ethylhexyl methacrylate, 35.8 g of styrene and 11.6 g of 1-dodecanethiol in 660 ml of tertiary butanol under nitrogen. Then, the initial charge was heated to 80° C. with stirring. On attainment of the reaction temperature 11.6 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=15 000 g/mol (by GPC, reference: polyethylene glycol).

The copolymer thus obtained was initially charged to a flask under nitrogen.

Then 50.7 g of maleic anhydride and 1.7 g of sodium hydroxide were added followed by heating to a temperature of 75 to 85° C. with stirring. Stirring was continued at that temperature for three hours and then 652 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 20

A flask equipped with stirrer, reflux condenser, internal thermometer and nitrogen inlet was initially charged with 517 g of polyalkylene glycol monomethacrylate (molar mass 750, molar EO/PO ratio 6.3), 68.2 g of 2-ethylhexyl methacrylate, 35.8 g of styrene and 13.2 g of 1-dodecanethiol in 470 ml of tertiary butanol under nitrogen. Then, the initial charge was heated to 80° C. with stirring. On attainment of the reaction temperature 13.2 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=10 000 g/mol (by GPC, reference: polyethylene glycol).

The copolymer thus obtained: was initially charged to a flask under nitrogen.

Then 67.6 g of maleic anhydride and 2.2 g of sodium hydroxide were added followed by heating to a temperature of 75 to 85° C. with stirring. Stirring was continued at that temperature for three hours and then 869 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 21

A flask equipped with stirrer, reflux condenser, internal thermometer and nitrogen inlet was initially charged with 280 g of polyalkylene glycol monomethacrylate (molar mass 350, molar EO/PO ratio 1.7), 79.2 g of 2-ethylhexyl methacrylate, 41.6 g of styrene and 15.3 g of 1-dodecanethiol in 480 ml of tertiary butanol under nitrogen. Then, the initial charge was heated to 80° C. with stirring. On attainment of the reaction temperature 15.3 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=13 500 g/mol (by GPC, reference: polyethylene glycol).

The copolymer thus obtained was initially charged to a flask under nitrogen.

Then 78.5 g of maleic anhydride and 2.6 g of sodium hydroxide were added followed by heating to a temperature of 75 to 85° C. with stirring. Stirring was continued at that temperature for three hours and then 1009 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 22

A flask equipped with stirrer, reflux condenser, internal thermometer and nitrogen inlet was initially charged with 387 g of polyalkylene glycol monomethacrylate (molar mass 750, molar EO/PO ratio 6.3), 87.5 g of lauryl methacrylate, 35.8 g of styrene and 11.6 g of 1-dodecanethiol in 660 ml of tertiary butanol under nitrogen. Then, the initial charge was heated to 80° C. with stirring. On attainment of the reaction temperature 11.6 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=9700 g/mol (by GPC, reference: polyethylene glycol).

The copolymer thus obtained was initially charged to a flask under nitrogen.

Then 50.6 g of maleic anhydride and 1.7 g of sodium hydroxide were added followed by heating to a temperature of 75 to 85° C. with stirring. Stirring was continued at that temperature for three hours and then 650 g of aqueous sodium sulfite solution (10%) were metered in. Stirring was continued at 60 to 70° C. until the reaction had ended, and finally the pH was adjusted to pH 7 with 50% aqueous sodium hydroxide solution.

SYNTHESIS EXAMPLE 23

A flask equipped with stirrer, reflux condenser, internal thermometer and nitrogen inlet was initially charged with 267 g of polyalkylene glycol monomethacrylate (molar mass 350, molar EO/PO ratio 1.7), 101.6 g of lauryl methacrylate, 41.6 g of styrene and 15.3 g of 1-dodecanethiol in 480 ml of tertiary butanol under nitrogen. Then, the initial charge was heated to 80° C. with stirring. On attainment of the reaction temperature 15.3 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=12 000 g/mol (by GPC, reference: polyethylene glycol).

The copolymer thus obtained was initially charged to a flask under nitrogen.

Then 74.8 g of maleic anhydride and 2.4 g of sodium hydroxide were added followed by heating to a temperature of 75 to 85° C. with stirring. Stirring was continued at that temperature for three hours and then 961 g of aqueous sodium sulfite solution (10%) were metered in. Stirring was continued at 60 to 70° C. until the reaction had ended, and finally the pH was adjusted to pH 7 with 50% aqueous sodium hydroxide solution.

Use Example: Pigment Formulation

Production of a Pigment Formulation

The pigment, in the form alternatively of powder, granulate or presscake, was pasted up in deionized water together with the dispersants and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, the dispersion was adjusted with deionized water to the desired final pigment concentration, the grinding media separated off and the pigment formulation isolated.

Evaluation of a Pigment Preparation

Color strength and hue were determined in accordance with DIN 55986. The rub-out test was carried out by applying the emulsion paint, after mixing with the pigment dispersion, to a paint card. Subsequently, the applied coating was rubbed with the finger on the lower part of the paint card. Incompatibility was present if the rubbed area is then more strongly or brightly colored than the adjacent area not aftertreated (the rub-out test is described in DE 2 638 946). Color strength and compatibilities with the medium to be colored was determined using an emulsion paint for exteriors (waterborne, 20% $TiO_2$).

Viscosity was determined using a cone-and-plate viscometer (RotoVisco 1) from Haake at 20° C. (titanium cone: Ø 60 mm, 1°), the relationship between viscosity and shear rate in a range between 0 and 200 $s^{-1}$ being investigated. Viscosities were measured at a shear rate of 60 $s^{-1}$.

To evaluate the storage stability of the dispersions, viscosity was measured directly after production of the formulation and also after four weeks' storage at 50° C.

The pigment formulation described in the example which follows was produced by the method described above, the following constituents being used in the stated amounts such that 100 parts of the pigment formulation are formed. Parts are by weight in the example:

| | |
|---|---|
| 50.0 parts | of C.I. Pigment Blue 15 |
| 8.0 parts | of polymer from synthesis example 23 |
| 1.5 parts | of wetter |
| 10.0 parts | of ethylene glycol |
| 0.2 part | of preservative |
| 30.3 parts | of water |

The pigment formulation has a high color strength in the white dispersion and is stable. The rub-out test shows no color strength differences compared with the rubbed area. The dispersion proves to be readily flowable and storage stable since it is still readily flowable after 28 days' storage at 50° C. Viscosity in the as-produced state is 430 mPa·s.

What is claimed is:

1. Anionically modified copolymers obtained by polymerization of monomers (A), (B) and (C) to yield nonionic copolymers having reactive terminal OH groups, and subsequent conversion of the terminal OH groups to anionic end groups, wherein (A) is a monomer of formula (I)

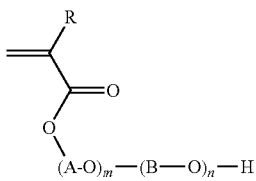

(I)

wherein
A is $C_2$-$C_4$-alkylene,
B is a $C_2$-$C_4$-alkylene other than A,
R is hydrogen or methyl,
m is from 1 to 500;
n is from 1 to 500,
and the sum total of m+n is from 2 to 1000;
(B) is an ethylenically unsaturated monomer containing an aromatic group; and
(C) is an ethylenically unsaturated monomer containing an alkyl radical, and wherein the copolymer is of the formulae (IV) or (V)

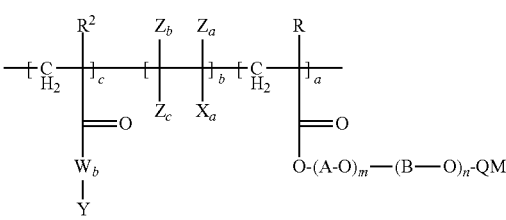

(IV)

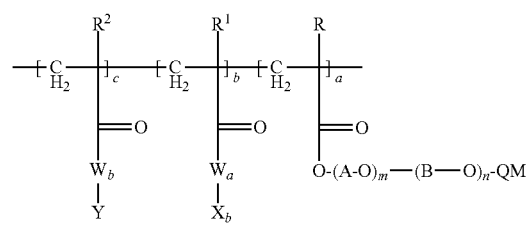

(V)

wherein
A is $C_2$-$C_4$-alkylene,
B is a $C_2$-$C_4$-alkylene other than A,
R is hydrogen or methyl,
m is from 1 to 500;
n is from 1 to 500;
and the sum total of m+n is from 2 to 1000;

$X_a$ is an aromatic or araliphatic radical having 3 to 30 carbon atoms optionally containing one or more of the hetero atoms N, O and S,
$Z_a$ is H or ($C_1$-$C_4$)-alkyl,
$Z_b$ is H or ($C_1$-$C_4$)-alkyl,
$Z_c$ is H or ($C_1$-$C_4$)-alkyl;
$R^2$ is hydrogen or methyl,
Y is an aliphatic hydrocarbyl radical having 1 to 30 carbon atoms, optionally linear, branched or cyclic, and optionally contain hetero atoms O, N S or a combination thereof and optionally are unsaturated,
$W_b$ is oxygen or an NH group;
$R^1$ is hydrogen or methyl,
$X_b$ is an aromatic or araliphatic radical having 3 to 30 carbon atoms optionally containing one or more of the hetero atoms N, O and S,
$W_a$ is oxygen or an NH group,
a=0.01 to 0.8; b=0.001 to 0.8; c=0.001 to 0.8;
subject to the proviso that the sum total of a+b+c is equal to 1,
Q is $SO_3$, $CH_2COO$, $PO_3M$ or sulfosuccinate, where M represents H, a monovalent metal cation, a divalent metal cation, $NH_4^+$, a secondary, tertiary or quaternary ammonium ion or a combination thereof.

2. The copolymer as claimed in claim 1, wherein the molar fraction of monomer (A) is 1 to 80%, monomer (B) is 0.1 to 80% and monomer (C) is 0.1 to 80%.

3. The copolymer as claimed in claim 1, wherein the molar fraction of monomer (A) is 10 to 70%, monomer (B) is 10 to 60% and monomer (C) is 10 to 60%.

4. The copolymer as claimed in claim 1, wherein the alkylene oxide units $(A-O)_m$ and $(B-O)_n$ are in blocks.

5. The copolymer as claimed in claim 1, wherein $(A-O)_m$ are propylene oxide units and $(B-O)_n$ are ethylene oxide units, or $(A-O)_m$ are ethylene oxide units and $(B-O)_n$ are propylene oxide units, and the molar fraction of ethylene oxide units is 50 to 98%, based on the sum total of ethylene oxide and propylene oxide units.

6. The copolymer as claimed in claim 5, wherein the molar fraction of ethylene oxide units is 60 to 95%, based on the sum total of ethylene oxide and propylene oxide units.

7. The copolymer as claimed in claim 1, wherein the anionic end groups are one of $SO_3M$, $CH_2COOM$, $PO_3M_2$ and sulfosuccinate, where M represents H, a monovalent metal cation, a divalent metal cation, $NH_4^+$, a secondary, tertiary or quaternary ammonium ion or a combination thereof.

8. A process for producing a copolymer as claimed in claim 1, comprising the step of free-radically polymerizing the monomers (A), (B) and (C) and converting the resulting terminal OH groups to anionic end groups.

9. A dispersant comprising a copolymer as claimed in claim 1.

10. The copolymer as claimed in claim 1, wherein Y is an aliphatic hydrocarbyl radical having 6 to 30 carbon atoms.

11. The copolymer as claimed in claim 1, wherein Y is an aliphatic hydrocarbyl radical having 9 to 20 carbon atoms.

12. A pigment or filler dispersant comprising a copolymer as claimed in claim 1.

* * * * *